United States Patent
Guss et al.

(10) Patent No.: US 9,639,494 B2
(45) Date of Patent: May 2, 2017

(54) SETTING A PCIE DEVICE ID

(71) Applicant: NVIDIA CORPORATION, Santa Clara, CA (US)

(72) Inventors: Jesse Max Guss, Menlo Park, CA (US); Philip Browning Johnson, San Jose, CA (US); Chris Marriott, Sunnyvale, CA (US); Wojciech Jan Truty, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 203 days.

(21) Appl. No.: 14/070,147

(22) Filed: Nov. 1, 2013

(65) Prior Publication Data

US 2015/0127860 A1 May 7, 2015

(51) Int. Cl.
*G06F 13/20* (2006.01)
*G06F 11/22* (2006.01)
*G06F 13/40* (2006.01)
*H01H 85/04* (2006.01)

(52) U.S. Cl.
CPC .......... *G06F 13/4072* (2013.01); *G06F 11/22* (2013.01); *H01H 85/04* (2013.01)

(58) Field of Classification Search
CPC .................................. G06F 21/71; G11C 8/20
USPC ........................................................ 710/313
See application file for complete search history.

(56) References Cited

U.S. PATENT DOCUMENTS

| | | | |
|---|---|---|---|
| 7,415,732 B2* | 8/2008 | Montecalvo | G06F 21/71 713/193 |
| 8,242,831 B2* | 8/2012 | Tong | G11C 8/20 257/209 |
| 2014/0253222 A1* | 9/2014 | Merchant | G06F 21/44 327/525 |

* cited by examiner

*Primary Examiner* — Titus Wong
(74) *Attorney, Agent, or Firm* — Artegis Law Group, LLP (57) ABSTRACT

One embodiment of the present invention includes a hard-coded first device ID. The embodiment also includes a set of fuses that represents a second device ID. The hard-coded device ID and the set of fuses each designate a separate device ID for the device, and each device ID corresponds to a specific operating configuration of the device. The embodiment also includes selection logic to select between the hardcoded device ID and the set of fuses to set the device ID for the device. One advantage of the disclosed embodiments is providing flexibility for engineers who develop the devices while also reducing the likelihood that a third party can counterfeit the device.

19 Claims, 6 Drawing Sheets

SETTING A PCIE DEVICE ID

BACKGROUND OF THE INVENTION

Field of the Invention

Embodiments of the present invention relate generally to computer processing and, more specifically, to setting a PCIE Device ID.

Description of the Related Art

The Peripheral Component Interconnect Express (PCIE) Device ID (DEVID) is a 16-bit number that uniquely identifies a computer hardware device to the software. In general, these 16-bit numbers can be used to identify a brand or a stock-keeping unit (SKU). There are a number of techniques that can be used to implement the DEVIDs on the hardware: hard-coding the DEVIDs; hard-coding a subset of the bits of a DEVID and including binary strap bits for another subset of the bits of the DEVID; replacing binary strap bits with multi-level straps; or fusing certain bits instead of hard-coding those bits. Each such approach has certain advantages and disadvantages.

As mentioned, some approaches to setting the DEVID use strap bits, or straps, to set the DEVID. Straps are board-level resistors that, in one implementation, can be pulled up or pulled down so that they register a 1 or a 0, and the 1 or 0 bits are detected set the DEVID. In other embodiments, a voltage level could be measured and a number of different strap values could be determined by the measured voltage level. Alternatively, a current could be measured through a resistor, allowing the strap value to be specified by the resistance. Or, the strap value could be configured by setting the charge time of a simple RLC circuit. The value of a strap can be changed per board, so that different customers who purchase the boards can receive the same chip but with different specifications. The chip is placed into the board and connects to the straps, and then the values of the straps are used to communicate the DEVID to the chip.

Some approaches to setting the DEVID use fuses. Fuses are generally a part of the chip. A fuse can be a piece of wire in the chip that is set so that the fuse pulls either high or low to simulate a 1 or 0. In that sense, fuses work similarly to straps, but fuses are an internal component of the chip. If a chip that uses fuses is plugged into a board, then that chip always reports the same DEVID. The DEVID, once set by the fuses, is generally not able to be altered by adjusting the values of any straps on the board. Therefore using fuses instead of straps provides more security against counterfeiting chips.

One use of DEVIDs is that computer chips, such as computer graphics chips in one example, can use a separate DEVID for each generation of a chip. Thus a graphics chip can be manufactured and that chip can be used for different product lines. Each product line may have a separate DEVID, and that DEVID identifies the chip to the software. For example, one DEVID may designate that this chip is a low-end product, and another DEVID may designate that this chip is a high-end product. Therefore, the same chip can be recognized as a low-end chip or a high-end chip depending on what value the DEVID is set at. With this functionality, manufactures can use one chip design for each chip they manufacture, but can sell those chips as multiple different products, each with different capabilities.

The manufacturers can use any of the techniques listed above for setting the DEVID of each chip. One solution for setting a DEVID is to use six bits of straps and 10 bits of fuses to set the 16-bit DEVID. However, customers who buy the chips, or other third parties, know how to strap the board, and they can figure out that those six strap bits can be used to set the DEVID to match the DEVID of a number of different products, not necessarily the DEVID set and intended by the manufacturer. Therefore, a customer can buy a low-end chip and use straps to make the chip identify (with the DEVID) as a high-end chip. A user who attempts to use the chip for high-end operations may experience poor performance because the chip is actually a low-end chip with a counterfeited DEVID. Allowing customers to set the DEVID with these six straps thus creates gray market and black market opportunities for unscrupulous resellers and can present performance issues to the end user. This is one disadvantage of using straps to set all or a part of the DEVID.

In addition, another potential disadvantage with using straps is that straps can also take up die space (straps also need a pad to connect to on the chip). Also, if six straps are used for the DEVID then that leaves fewer straps available for other purposes.

Another existing technique, as mentioned above, is hard-coding the DEVIDs. This provides a more secure product that is more difficult for customers to counterfeit that using straps. However, one downside to hard-coding the DEVIDs is that this is inflexible for bring-up engineers who now cannot set the DEVID to a different value for testing. In addition, this solution does not allow a customer to perform a field upgrade of already-purchased chips. For example, a customer may purchase 10,000 chips and, after a period of time, have some chips left over that they have not sold. If an upgraded version of that chip is released (i.e., the same chip but with a new DEVID), the customer may want to rebrand the chip and sell the chip as the upgraded version. If straps are used, the manufacturer can tell the customer how to strap the new DEVID, and the software will recognize the new DEVID and preferably turn on new features. If DEVIDs are hard-coded, this flexibility to rebrand is taken away from customers.

In conclusion, a major drawback to conventional approaches is that the techniques that provide flexibility for engineers who develop and upgrade devices can also make counterfeiting those devices easier. Straps can provide flexibility, but also increase the chances of counterfeiting. Another drawback is that straps can take up valuable die area.

Accordingly, what is needed in the art is a more effective way to implement DEVIDs on hardware devices, such as graphics processing units and other types of processing units.

SUMMARY OF THE INVENTION

One embodiment of the present invention includes a hard-coded first device ID. The embodiment also includes a set of fuses that represents a second device ID. The hard-coded device ID and the set of fuses each designate a separate device ID for the device, and each device ID corresponds to a specific operating configuration of the device. The embodiment also includes selection logic to select between the hardcoded device ID and the set of fuses to set the device ID for the device.

One advantage of the disclosed technique is providing flexibility for engineers who develop the devices while also reducing the likelihood that a third party can counterfeit the device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
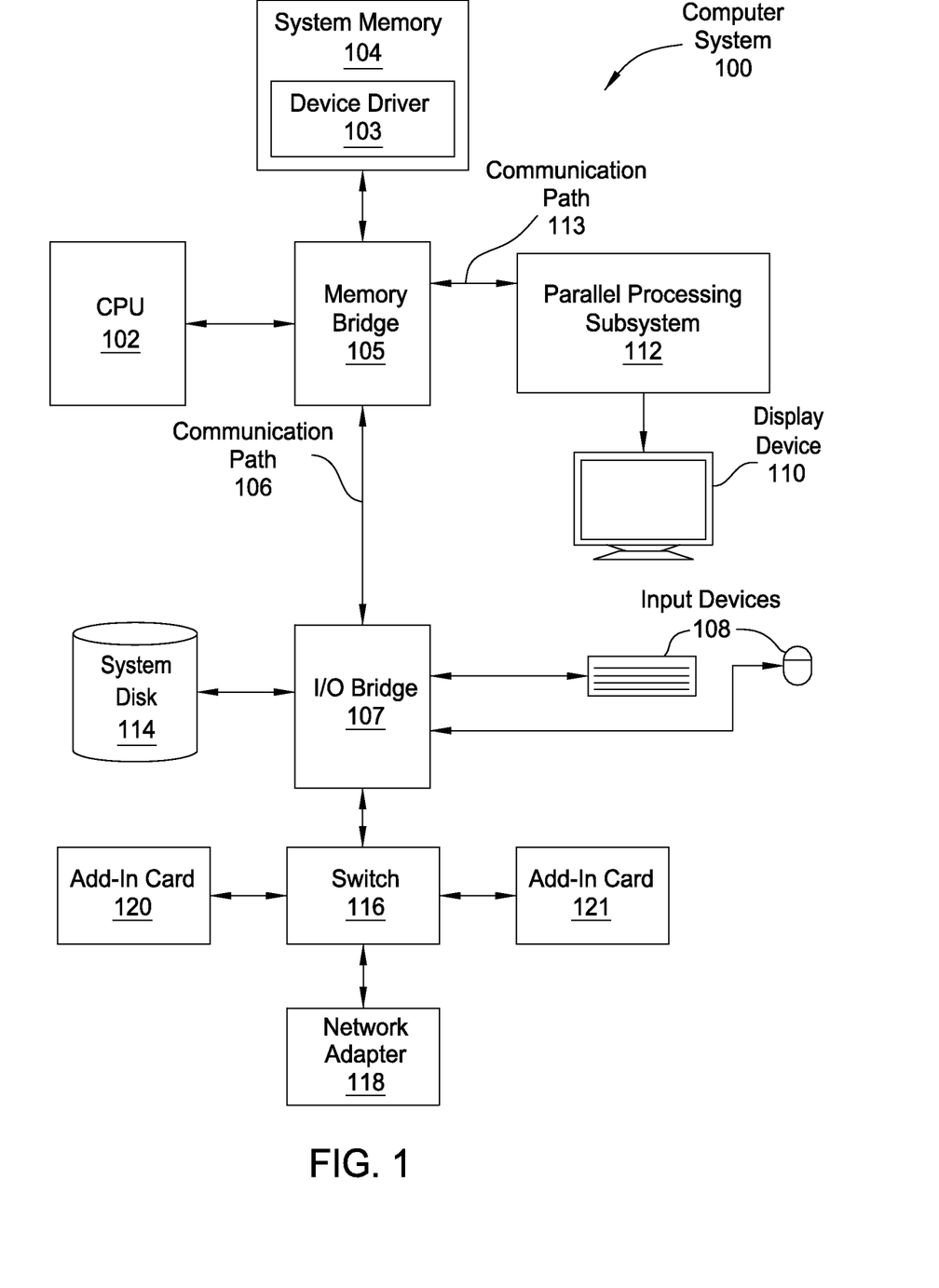
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
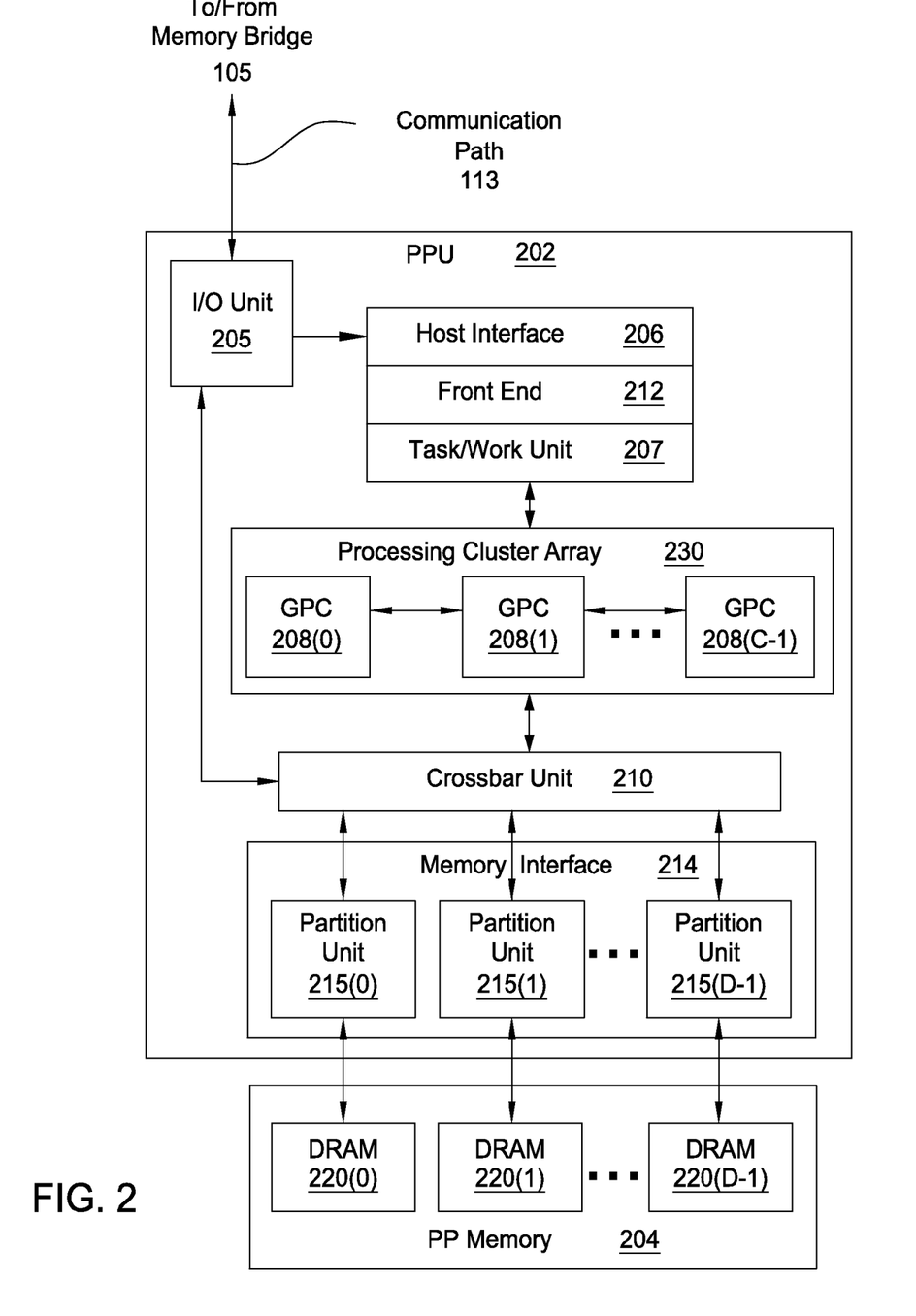
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Setting the PCIE DEVID

A number of conventional techniques can be used to implement DEVIDs on hardware. Such techniques include hard-coding the DEVIDs, hard-coding a subset of the bits of a DEVID and also including binary strap bits, replacing binary straps with mufti-level straps, or fusing certain bits instead of hard-coding them. As noted above, each approach has certain advantages and disadvantages.

There are a number of issues to consider when designing a solution for setting the DEVID. First, the bring-up engineers working for the manufacturer need to be able to change the DEVID easily for testing purposes. Customers or OEM partners should not be allowed to easily change the DEVID. The manufacturer may want to waive these two requirements for some SKUs. Also, the marketing department for the manufacturer would like flexibility to create many SKUs. Marketing also would like to have "upgradeable" SKUs in the field as described above. Finally, the implementation should be reliable/robust.

Figure 3:
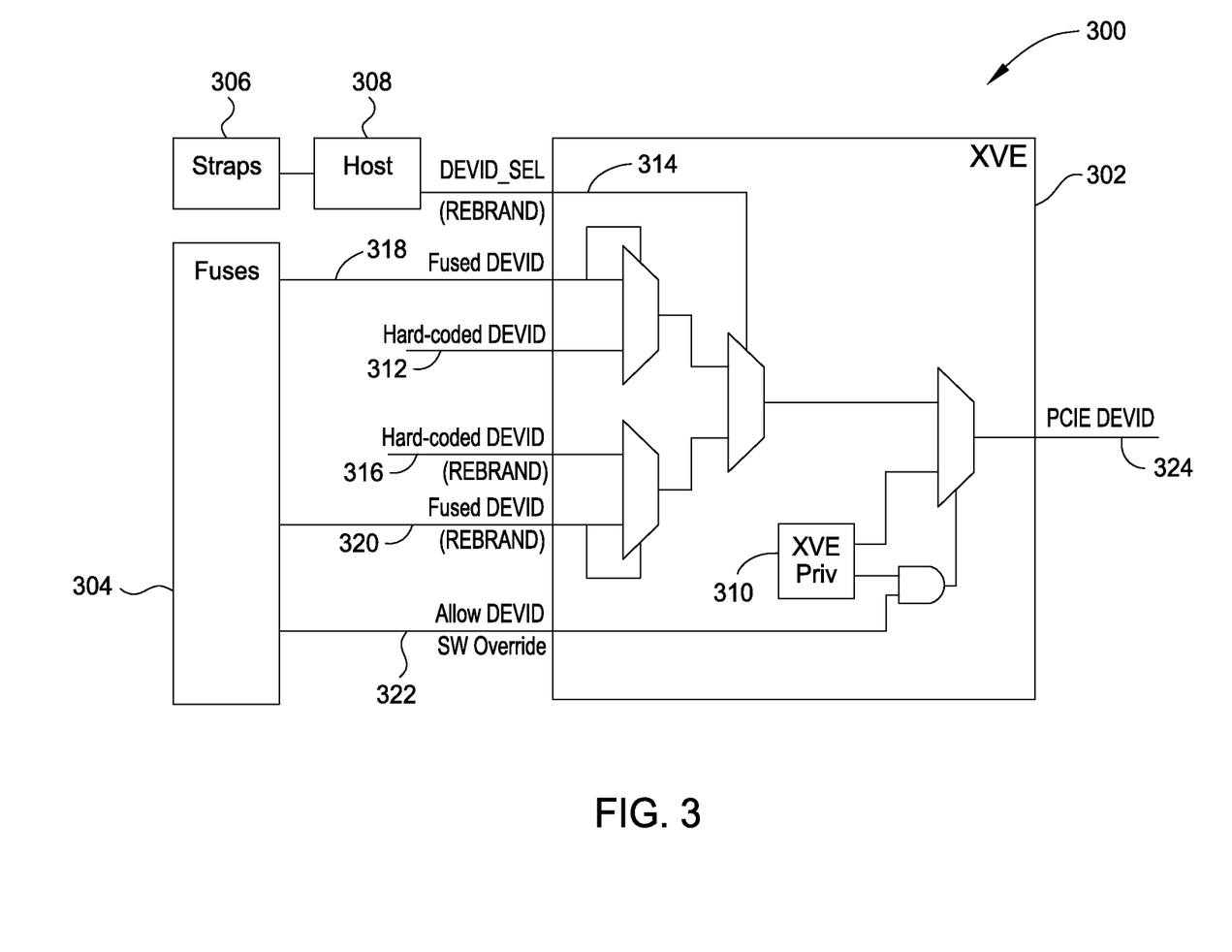
FIG. 3 is a conceptual diagram of a circuit configured for setting a PCIE DEVID, according to one embodiment of the present invention.

FIG. 3 is a conceptual diagram of a circuit 300 for setting the PCIE DEVID, according to one embodiment of the present invention. Circuit 300 provides one example solution to the issues outlined herein. The solution embodied in FIG. 3 may be implemented on the PPU 202, described above with respect to FIG. 2, or on any other appropriate processor. In various embodiments, the solution may be embodied in hardware, software, or a combination of the two.

As shown in FIG. 3, two hard-coded DEVIDs are available, and each can be rebranded one time. Circuit 300 uses banks of sixteen fuses 304 to set these two hard-coded DEVIDs. One strap 306 is also used to implement a rebranded DEVID for each of the hard-coded DEVIDs, where the rebranded DEVIDs are also implemented in fuses. In addition, in this embodiment, all DEVIDs set by the fuses can be overridden by software override at first silicon, providing flexibility for product engineers. This override functionality can be removed when the product ships. In some other embodiments, the override functionality may be retained for use by trusted third parties.

In other embodiments, the number of sets of fuses (and thus the number of potential DEVIDs) can vary. For example, some chips may only use two banks of fuses for two possible DEVIDs. Other chips may use more than four banks of fuses. Any suitable number of banks may be used.

In some embodiments, one or more of the banks of fuses are disabled before the customer receives the chips. In those cases, the customer may only have access, for example, to two of the sets of fuses and thus have access to two DEVIDs. The other DEVIDs that were on the chip may be used for a different product line or used internally for testing.

Referring back to FIG. 3, Transfer Logic Layer (XVE) 302 implements the logic circuit used to select and output the appropriate final DEVID 324. This output is the DEVID used to identify the chip. XVE logic 302 operates in conjunction with fuses 304, straps 306, host 308, and XVE Priv 310 to set the DEVID 324. XVE logic 302 selects the DEVID to output from among DEVIDs 312, 316, 318, and 320, in this example. In a testing environment, other DEVIDs may be implemented with a software override.

As a first aspect of circuit 300, a special fuse 322 allows software to override the DEVID in XVE priv space 310. Fuse 322 provides bring-up engineers and other researchers with the ability to set any DEVID that they choose as DEVID 324. With this functionality, an engineer can use a single chip and then switch among the valid DEVIDs easily (using the software override) to test various configurations. Without this software override, an engineer may need multiple chips to test all the different DEVIDs, thus increasing the complexity of testing. The software override thus provides advantages to the manufacturer.

To hinder OEMs or end users from also being able to set any DEVID, the fuse that allows the software override is disabled in production. Due to the nature of fuses, retrieving the software override functionality would generally be difficult for an unauthorized third party after the fuse has been disabled. For that reason, using a fuse to allow a software override and then disabling that fuse before shipment provides some security against counterfeiting chips.

As a second aspect of circuit 300, a hard-coded DEVID 312 is set with one bank of sixteen fuses. This DEVID could be, for example, a DEVID assigned to a low-end chip, such as a graphics chip in a home desktop computer. XVE logic 302 outputs this DEVID 312 to DEVID output 324, and therefore this DEVID 312 identifies the chip to the software. This could be considered a "base" configuration. In one embodiment, only fuses are used to set this DEVID.

As a third aspect, circuit 300 also includes a rebrand for the hard-coded DEVID (identified as hard-coded DEVID 316), implemented with strap 306. As discussed above, the manufacturer of the chip may want to sell a chip this year but rebrand the chip next year to an updated version with a new DEVID. Resellers of the chips who have old inventory can also rebrand the chips and sell them as the new version with the new DEVID. When the rebrand is ready to implement, the manufacturer can notify the resellers and the resellers can set strap 306. Strap 306 activates DEVID_SEL line 314, and XVE logic 302 then outputs the hard-coded DEVID rebrand 316 to DEVID output 324, and the chip now identifies as DEVID 316. DEVID 316 is the DEVID for the rebranded version of the chip previously identified as DEVID 312. DEVID 316 is also hard-coded with another bank of fuses. Thus, this strap provides a reseller with the ability to rebrand leftover inventory and sell the rebranded versions of the chip once the manufacturer approves the rebrand.

Even though this implementation allows a reseller to set a strap to rebrand the chip, this approach can reduce the danger of chips being counterfeited by customers who set the strap and rebrand the chip before the manufacturer approves the rebrand. The "base" DEVID 312 is recognized by the software driver as a valid DEVID, and therefore the chip operates with that DEVID. However, the rebranded DEVID (DEVID 316) is not recognized by the software until the manufacturer updates the driver. If a reseller sets the strap in an attempt to upgrade the chip to DEVID 316 before the rebrand is ready and approved by the manufacturer, then the chip may not operate properly because the driver has not been updated. Therefore, the manufacturer can more easily discourage and reduce early rebranding by not recognizing the rebranded DEVID until the rebrand is officially announced.

Once a rebrand occurs, a manufacturer can stop selling chips with the old DEVID (DEVID 312 in the above example), and instead can manufacture and sell new chips that have the rebranded DEVID as the base configuration and an upgraded DEVID for the next rebrand. This strategy allows every chip sold by the manufacturer to have the ability to be rebranded and upgraded one time. As an example, suppose that a first generation chip is given the product name "650" and when the rebrand occurs the chip is rebranded as a "730." After the rebrand, if the manufacturer implements the rebrand on existing "650" chips (by setting the strap 306), all subsequent chips sold are now "730" chips. These chips, however, do not have an upgrade available because the rebrand was already implemented on these chips. A rebranded DEVID is not available in these "650/730" chips. As a solution, the manufacture can stop selling the 650 chips after the rebrand and instead manufacture new second generation chips with the product name "730." In these chips, "730" is the base configuration (identified by DEVID 312) and a rebranded DEVID 316 is again made available. The rebrand product name might be, for example, "810." Therefore these "730/810" chips can also be rebranded and upgraded one time, just as the "650/730" chips were. Manufacturing every chip with the ability to be rebranded at least once provides advantages that sales and marketing teams can use to sell chips.

As a fourth aspect of circuit 300, a pair of DEVIDs separate and distinct from the hard-coded DEVIDs 312 and 316 can be implemented with two more banks of fuses. The DEVIDs in this pair of DEVIDs (illustrated as DEVIDs 318 and 320 in FIG. 3) are referred to as Fused DEVIDs. When a chip is manufactured, the hard-coded DEVIDs 312 and 316 might represent a low-end or basic configuration for the chip, such as a graphics chip for home and personal use. The fused DEVIDs 318 and 320 can represent the high-end or advanced configuration for the chip, such as a graphics chip used for intensive processing in a professional environment. Thus, a single chip can be manufactured and implemented as any of four possible configurations, each configuration associated with a separate DEVID, depending on how the fuses and straps are set.

When a chip is sold, the chip can be set up and shipped as a low-end chip with hard-coded DEVID 312 as the active DEVID and hard-coded DEVID 316 available as a rebrand once strap 306 is set. Thus, this chip provides the customer access to two DEVIDs, the original DEVID and a rebranded DEVID. However, in some embodiments, a specific set of fuses 304 can be disabled that allows these two hard-coded DEVIDs to be replaced by fused DEVIDs 318 and 320 and output by XVE logic 302. In this implementation, fused DEVID 318 is the active DEVID when the chip is shipped and fused DEVID 320 is available for a rebrand at the appropriate time. These fused DEVIDs are set with fuses in the bank of fuses 304 just as the hard-coded DEVIDs (312 and 316) were set. Therefore, the security associated with DEVIDs set by fuses instead of straps also applies to the fused DEVIDs 318 and 320. With four sets of fuses, as in this example, testing engineers can test different configurations of the chip but then one or more of those configurations can be disabled before the chip is sold. The customer, therefore, may only have access to two DEVIDs, and not all four DEVIDs.

In the fourth aspect, the appropriate fuses in fuses 304 were disabled by the manufacturer to override the hard-coded DEVIDs (312 and 316) and allow the fused DEVIDs to be used to identify the chip. This could be, for example, a high-end chip configuration that is more powerful than the low-end chip configuration represented by the hard-coded DEVIDs. When the chip is shipped, XVE logic 302 outputs the fused DEVID 318 to output 324, so the chip identifies itself to the software as the high-end chip represented by DEVID 318. Therefore, one chip can be manufactured and tested but that chip can be sold as either a high-end chip or a low-end chip, depending on the final state of the fuses when the chip is delivered to the customer.

In a fifth aspect, the pair of fused DEVIDs 318 and 320 operate similarly to the hard-coded DEVIDs 312 and 316 with respect to rebranding using strap 306. When the manufacturer decides to rebrand, the manufacturer notifies the customers and the customers can set strap 306. When strap 306 is set, DEVID 320 is output to output 324 and the high-end configuration has been successfully rebranded.

Because the initial selection between hard-coded DEVIDs (312 and 316) and fused DEVIDs (318 and 320) is determined by the manufacturer when fuses are disable in fuses 304, this reduces the opportunities for a reseller or customer to purchase a low-end chip (represented by DEVID 312) and turn the chip into a high-end chip (represented by DEVID 318). Most customers and resellers do not have the required equipment or expertise to alter the fuses in the chip, so the risk of counterfeiting is reduced.

As noted above, the use of fuses to select between a pair of hard-coded DEVIDs and a separate pair of fused DEVIDs allows a low-end configuration for a chip and a high-end configuration for a chip to be manufactured in the same chip and selected with fuses by the manufacturer. This solution can therefore allow testing engineers to test the high-end configuration and the low-end configuration using the same test chip.

In conclusion, circuit 300 achieves a number of advantages for setting the DEVID. First, bring-up engineers are able to change the DEVID easily for testing, using the software override. Second, OEM partners and customers cannot easily change the DEVID. Third, engineers can flip between the low-end configuration chip and the high-end configuration chip for testing. Fourth, a number of stock-keeping units (SKUs) can be created for a single chip. Fifth, chips can be upgraded in the field by using the strap for rebranding, which is advantageous for marketing and sales. Finally, the implementation can be cheaper and more reliable than existing solutions.

Figure 4:
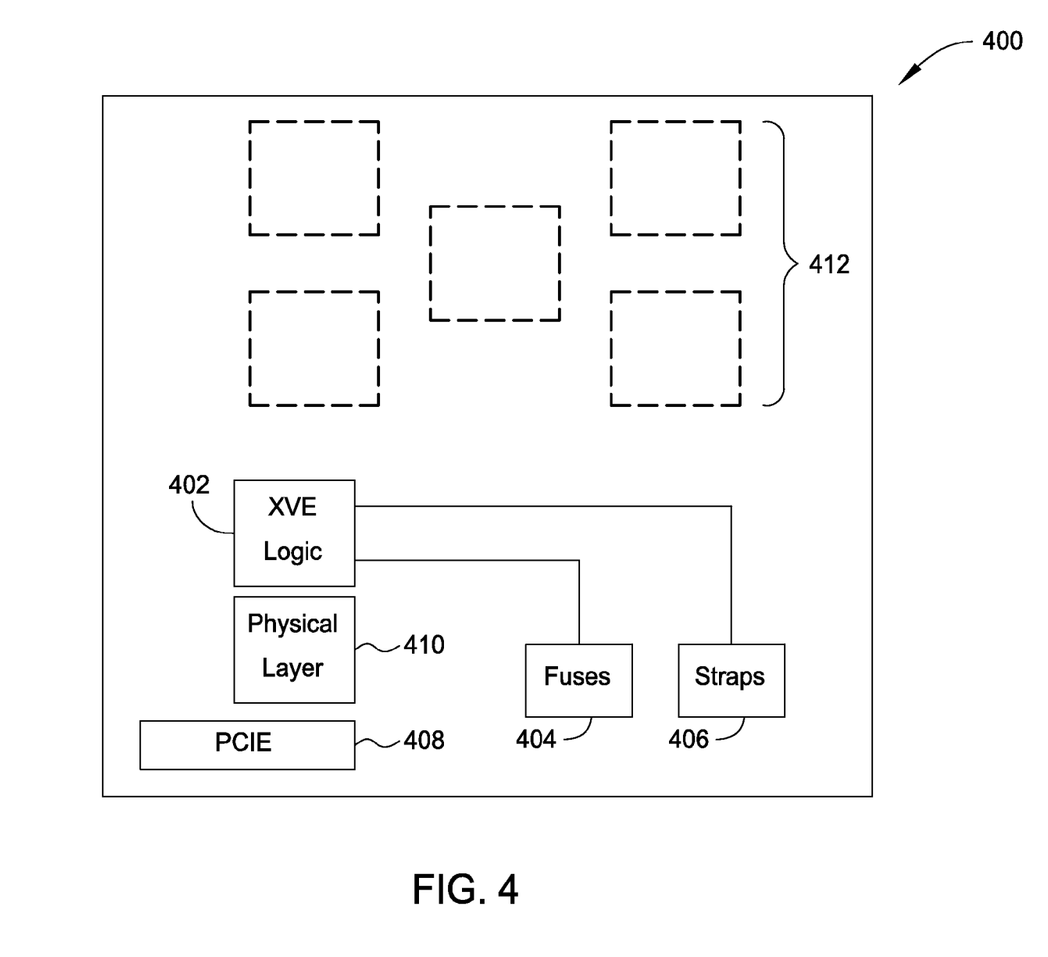
FIG. 4 is a conceptual block diagram of a processing unit configured with the circuit of FIG. 3, according to one embodiment of the present invention.

FIG. 4 is a conceptual block diagram of a processing unit 400 configured with the circuit 300 of FIG. 3, according to one embodiment of the present invention. The processing unit 400 embodied in FIG. 4 may be the PPU 202 of FIG. 2 or any other appropriate processor. In various embodiments, the XVE logic 402 in conceptual block diagram 400 may be embodied in hardware, software, or a combination of the two. The components in diagram 400 are conceptual and thus the size and location of the components are merely exemplary in nature.

As shown, XVE Logic 402 receives input from fuses 404 and straps 406 to determine the DEVID to output, as described above with respect to FIG. 3. XVE Logic 402 represents the transfer logic layer, while physical layer 410 represents the transfer physical layer. XVE Logic 402, as also illustrated in FIG. 3, is configured to determine and output the DEVID to PCIE 408 to identify the device for proper operation. Elements 412 in block diagram 400 represent components of the graphics engine, audio engine, or other processing components.

Figure 5:
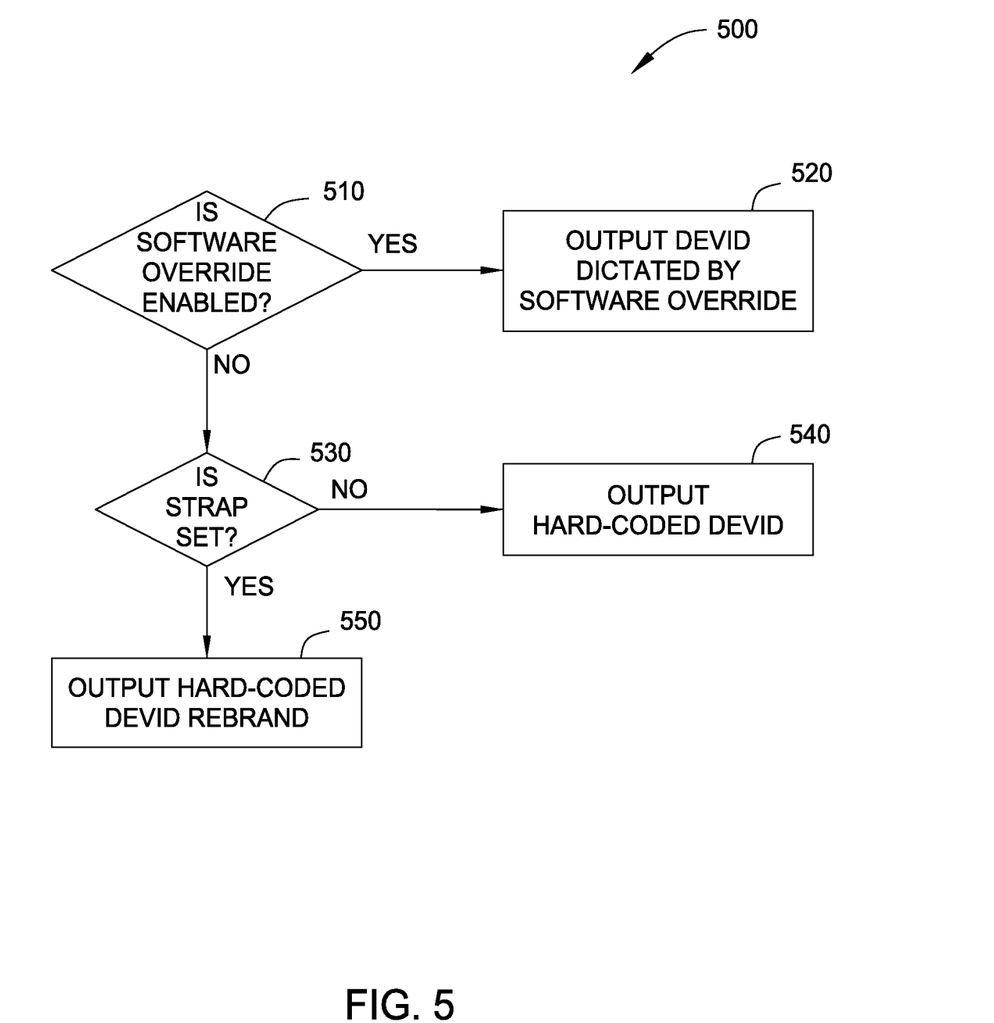
FIG. 5 is a flow diagram of method steps for setting a PCIE DEVID, according to one embodiment of the present invention.

FIG. 5 is a flow diagram of method steps for setting a PCIE DEVID for a processing device, according to one embodiment of the present invention. Although the method steps are described in conjunction with FIGS. 1-4, persons skilled in the art will understand that any system configured to perform the method steps, in any order, falls within the scope of the present invention.

As shown, a method 500 begins in step 510, where XVE logic 302 determines if a software override is enabled. If the software override is enabled, then the method proceeds to step 520, where software override logic overrides the DEVID. As previously explained herein, the software override may be enabled, for example, when engineers are testing a chip. If the software is not enabled, then the method proceeds to step 530. At step 530, XVE logic 302 evaluates whether the strap that selects the rebranded DEVID is set. If the strap is not set, then the method proceeds to step 540, where XVE Logic 302 outputs the hard-coded DEVID to identify the chip. In some embodiments, this DEVID represents the base configuration of the chip. If the strap is set in step 530, then the method proceeds to step 550, where XVE logic 302 outputs the rebranded DEVID to identify the chip. In some embodiments, the strap is set and the rebranded DEVID is output after the manufacturer has enabled the rebrand as described above.

Figure 6:
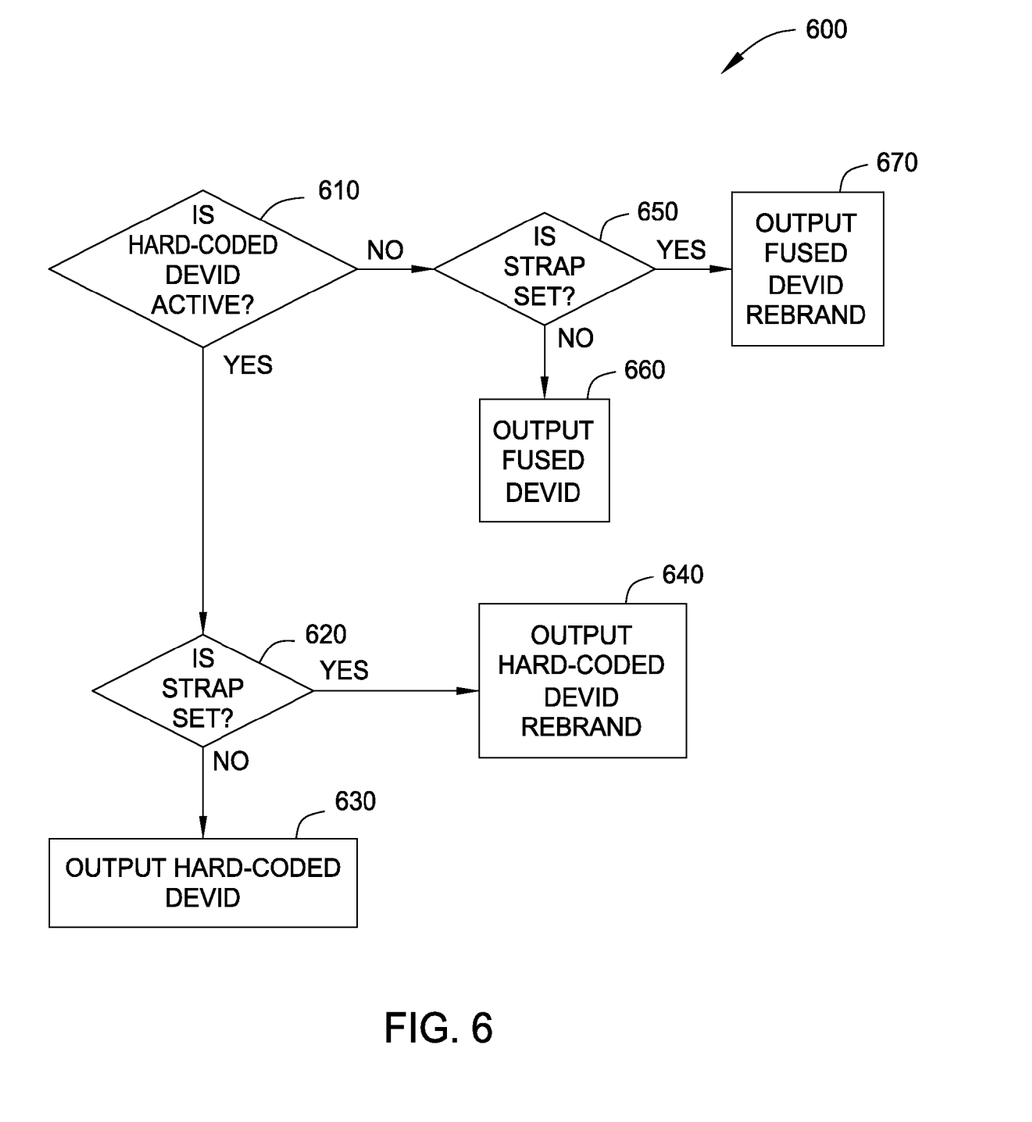
FIG. 6 is a flow diagram of method steps for setting a PCIE DEVID, according to another embodiment of the present invention.

FIG. 6 is a flow diagram of method steps for setting a PCIE DEVID for a processing device, according to another embodiment of the present invention. Although the method steps are described in conjunction with FIGS. 1-4, persons skilled in the art will understand that any system configured to perform the method steps, in any order, falls within the scope of the present invention.

For explanatory purposes only, the description of FIG. 6 assumes an embodiment where a chip is manufactured with four banks of fuses, but a customer is given access to only two of those banks of fuses, and thus access to only two DEVIDs. This particular implementation and description are not intended to, and in no way, limit the scope of the present invention.

As shown, a method 600 begins in step 610, where XVE logic 302 determines if the hard-coded DEVID is active. If the hard-coded DEVID is active, then the method proceeds to step 620, where XVE logic 302 determines if the strap is set. If the strap is not set, then the method proceeds to step 630, where XVE logic 302 outputs the hard-coded DEVID to identify the chip. If the strap is set, then the method proceeds to step 640, where XVE logic 302 outputs the rebranded DEVID to identify the chip. In some embodiments, the strap is set and the rebranded DEVID is output after the manufacturer has enabled the rebrand as described above.

Referring back now to step 610, XVE logic 302 determines the hard-coded DEVID is not active, and then the method proceeds to step 650. Hard-coded DEVID may not be active if, for example, one or more banks of fuses associated with hard-coded DEVID were disabled by the manufacturer before the chip was sent to the customer. If hard-coded DEVIDs are not active, then fused DEVIDs are used in this embodiment to identify the chip, as discussed above with respect to FIG. 3. At step 650, XVE logic 302 determines if the strap is set. If the strap is not set, then the method proceeds to step 660, where XVE logic 302 outputs the fused DEVID to identify the chip. If the strap is set, then the method proceeds to step 670, where XVE logic 302 outputs the fused rebranded DEVID to identify the chip. In some embodiments, the strap is set and the fused rebranded DEVID is output after the manufacturer has enabled the rebrand as described above.

Although the embodiments described herein have discussed the use of circuit 300 to set a DEVID, this circuit or similar logic could be used for any protocol where a unique ID or hash-tag is output to identify a product.

In sum, logic is used to select a DEVID for output based on the value of one or more banks of fuses and the value of a strap. A computer chip may include multiple sets of fuses operable to output different values for a DEVID. The circuit, logic, and algorithms described above may be used to select from among the various banks of fuses to output the appropriate DEVID. A single strap can be used to select between two of the DEVIDs. Fuses may also be used to select between groups of DEVIDs. Using embodiments of the present invention to select a DEVID solves several issues associated with existing systems for selecting a DEVID.

One advantage of the systems and techniques disclosed herein is that business units, bring-up engineers, and software developers have the flexibility to test and sell products. Another advantage is that the systems and techniques disclosed herein provide security that reduces the ability of third parties to change the PCIE DEVID. A third advantage is that fewer straps are used in this system than in previous solutions, which saves die area.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A system configured for setting a device identification (ID) for a device, the system comprising:
   a hard-coded first device ID;
   a set of fuses that is set with a second device ID;
   first level selection logic that selects between the hard-coded first device ID and the second device ID associated with the set of fuses to designate a selected device ID for the device; and second level selection logic that selects between the selected device ID and a rebranded third device ID associated with an updated version of the device, wherein the hard-coded device ID, the set of fuses, and the rebranded third device ID each designates a separate device ID for the device, and each separate device ID corresponds to a specific operating configuration of the device.

2. The system of claim 1, wherein the first selection logic accesses the value of a strap to determine whether to select the hard-coded first device ID or the second device ID.

3. The system of claim 1, wherein the set of fuses set with the second device ID includes sixteen fuses.

4. The system of claim 1, wherein each device ID comprises a Peripheral Component Interconnect Express device identification (PCIE DEVID).

5. The system of claim 1, further comprising software override logic operable to override the device ID selected by the second level selection logic.

6. The system of claim 5, wherein the software override logic is configured to be disabled to prevent the device ID selected by the second level selection logic from being overridden.

7. The system of claim 5, wherein the software override logic is configured to output a fourth device ID that is different than each of the hard-coded first device ID, the second device ID, and the rebranded third device ID.

8. A method for configuring a device identification (ID) to identify a device, comprising:

accessing the value of a first strap, wherein:
if the first strap has a first value, then selecting a first device ID that is hard-coded to designate a selected device ID; and
if the first strap has a second value, then selecting a second device ID to designate the selected device ID, wherein a set of fuses is set with the second device ID, and accessing the value of a second strap, wherein:
if the second strap has a third value, then selecting the selected device ID to designate a final device ID; and
if the second strap has a fourth value, then selecting a rebranded third device ID to designate a final device ID.

9. The method of claim 8, wherein each device ID comprises a Peripheral Component Interconnect Express device identification (PCIE DEVID).

10. The method of claim 8, wherein the set of fuses set with the second device ID includes sixteen fuses.

11. The method of claim 8, further comprising overriding the final device ID with software override logic to output a fourth device ID that is different than the first device ID, the second device ID, and the rebranded third device ID.

12. A computing device, comprising:
a memory; and
a processing unit coupled to the memory and including:
a subsystem that sets a device identification (ID) for the processing unit, the subsystem having:
a hard-coded first device ID;
a set of fuses that is set with a second device ID;
first level selection logic to that selects between the hard-coded first device ID and the second device ID associated with the set of fuses to designate a selected device ID for the device; and
second level selection logic that selects between the selected device ID and a rebranded third device ID associated with an updated version of the device,
wherein the hard-coded device ID, the set of fuses, and the rebranded third device ID each designates a separate device ID for the device, and each separate device ID corresponds to a specific operating configuration of the device.

13. The computing device of claim 12, wherein the first level selection logic accesses the value of a strap to determine whether to select the hard-coded first device ID or the second device ID.

14. The computing device of claim 12, wherein the set of fuses includes sixteen fuses.

15. The computing device of claim 12, wherein each device ID comprises a Peripheral Component Interconnect Express device identification (PCIE DEVID).

16. The computing device of claim 12, wherein the subsystem further comprises software override logic operable to override the final device ID selected by the second level selection logic.

17. The computing device of claim 16, wherein the software override logic is disabled to prevent the final device ID selected by the second-level selection logic from being overridden.

18. The system of claim 1, wherein, when the set of fuses is selected, the selection logic further outputs the second device ID set by the set of fuses as the device ID for the device.

19. The system of claim 1, further comprising a first strap, wherein the second level selection logic:
selects the selected device ID to designate a final device ID if the first strap has a first value; and
selects the rebranded third device ID to designate a final device ID if the first strap has a second value.

* * * * *

UNITED STATES PATENT AND TRADEMARK OFFICE
CERTIFICATE OF CORRECTION

PATENT NO. : 9,639,494 B2  
APPLICATION NO. : 14/070147  
DATED : May 2, 2017  
INVENTOR(S) : Jesse Max Guss et al.

Page 1 of 1

It is certified that error appears in the above-identified patent and that said Letters Patent is hereby corrected as shown below:

In the Claims

Column 14, Claim 12, Line 12, please delete "to".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*